United States Patent
Volzka et al.

(10) Patent No.: US 11,003,355 B2
(45) Date of Patent: May 11, 2021

(54) IMPLEMENTING VM MEMORY RIGHT-SIZING USING VM MEMORY COMPRESSION

(71) Applicant: International Business Machines Corporation, Armonk, NY (US)

(72) Inventors: Charles Volzka, Rochester, MN (US); Sadek Jbara, Tayibe (IL); Joseph W. Cropper, Austin, TX (US); Ofer Biran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/177,665

(22) Filed: Nov. 1, 2018

(65) Prior Publication Data
US 2020/0142603 A1    May 7, 2020

(51) Int. Cl.
*G06F 3/00* (2006.01)
*G06F 3/06* (2006.01)
*G06F 9/455* (2018.01)

(52) U.S. Cl.
CPC .......... *G06F 3/0608* (2013.01); *G06F 3/0653* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 9,342,344 B2 | 5/2016 | Guo et al. |
| 9,600,317 B2 | 3/2017 | Guo et al. |
| 9,766,945 B2 | 9/2017 | Gaurav et al. |
| 2014/0189267 A1* | 7/2014 | Qi .................. G06F 16/128 711/158 |
| 2015/0347181 A1 | 12/2015 | Myrick et al. |
| 2017/0220374 A1 | 8/2017 | Beveridge et al. |

(Continued)

FOREIGN PATENT DOCUMENTS

WO    WO9518997 A3    8/1995

OTHER PUBLICATIONS

Ishan Banerjee,, "Memory Overcommitment in the ESX Server", VMware, Inc. Vmware Technical Journal, vol. 2, No. 1, Jun. 2013, pp. 2-13 http://download3.vmware.com/software/vmw-tools/papers/VMTLissue_3.pdf https://labs.vmware.com/vmtj/memory-overcommitment-in-the-esx-server.

(Continued)

*Primary Examiner* — Midys Rojas
(74) *Attorney, Agent, or Firm* — Donald J. O'Brien

(57) ABSTRACT

A method and system are provided for implementing virtual machine (VM) memory right-sizing using VM memory compression. VM memory right-sizing includes monitoring VM memory utilization relative to a memory utilization up-size threshold and a memory utilization down-size threshold for the VM, and a current memory compression factor of total effective memory based on compression. When the VM is above the memory utilization up-size threshold and at a maximum memory allocation, a memory compression factor is increased. When the VM is below the memory utilization down-size threshold and the current memory compression factor is greater than one, the memory compression factor is decreased.

20 Claims, 3 Drawing Sheets

(56) References Cited

U.S. PATENT DOCUMENTS

2017/0351453 A1* 12/2017 Malladi ................ G06F 3/0604
2018/0046396 A1   2/2018 Myrick et al.

OTHER PUBLICATIONS

Curt Kolovson et al. Vmware Techanical Journal, vol. 2, No. 1, Jun. 2013, pp. 1-63.
Workload RightSizing, VMTurbo, Inc. pp. 1-52013.

* cited by examiner

IMPLEMENTING VM MEMORY RIGHT-SIZING USING VM MEMORY COMPRESSION

FIELD OF THE INVENTION

The present invention relates generally to the data processing field, and more particularly, relates to method and system for implementing virtual machine (VM) memory right-sizing using VM memory compression.

DESCRIPTION OF THE RELATED ART

IBM® PowerVC™ is an advanced virtualization and cloud management offering. Built on OpenStack, it provides simplified virtualization management and cloud deployments for IBM AIX®, IBM i and Linux virtual machines (VMs) running on IBM Power Systems™. The offer is designed to build private cloud on the Power Systems servers and improve administrator productivity. It can further integrate with multi-cloud environments through higher-level cloud orchestrators.

Features of an AIX® operating system include Active Memory Expansion (AME) that compresses VM memory such that processes see more memory available than is allocated to the VM. Memory is compressed at the expense of increased CPU utilization and limited by the compressibility of the workload itself.

VM memory right-sizing is the process by which virtual machines (VMs) memory resources are adjusted up or down as the workload requires. For example, if a workload is memory starved over a period of time, a cloud optimizer could add more memory to the workload so that it can run more efficiently. On the contrary, if a workload is utilizing only a fraction of memory over a period of time, a cloud optimizer could reduce the amount of memory thus allowing other workloads to benefit from the capacity.

Typically, VM right-sizing has been addressed by manual efforts with VM usage patterns observed over time and manual adjustments made.

SUMMARY OF THE INVENTION

Principal aspects of the present invention are to provide a method and system for implementing enhanced virtual machine (VM) memory right-sizing using VM memory compression. Other important aspects of the present invention are to provide such method and system substantially without negative effects and that overcome many of the disadvantages of prior art arrangements.

In brief, a method and system are provided for implementing virtual machine (VM) memory right-sizing using VM memory compression. VM memory right-sizing includes monitoring VM memory utilization relative to a memory utilization up-size threshold and a memory utilization down-size threshold for the VM, and a current memory compression factor of total effective memory based on compression. When the VM is above the memory utilization up-size threshold and at a maximum memory allocation, a memory compression factor is increased. When the VM is below the memory utilization down-size threshold and the current memory compression factor is greater than one, the memory compression factor is decreased.

In accordance with features of the invention, the memory compression factor is increased by up to a predefined compression-step-size, addressing both the memory utilization and increasing available CPU utilization.

In accordance with features of the invention, the memory compression factor is decreased by up to a predefined compression-step-size, addressing both the memory utilization and decreasing available CPU utilization.

In accordance with features of the invention, the memory compression factor is increased by up to a predefined compression-step-size without exceeding a maximum compression factor or a maximum variable compression value.

In accordance with features of the invention, the memory compression factor is increased by up to a predefined compression-step-size without exceeding a maximum compression CPU utilization.

In accordance with features of the invention, the memory compression factor is decreased by up to a predefined compression-step-size without dropping below a current VM compression ratio of one.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention. References to "file" should be broadly considered to include and may be substituted with block, page or any other logical subdivision of data.

The terminology used herein is for describing embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for virtual machine (VM) memory right-sizing using VM memory compression. VM memory right-sizing includes monitoring VM memory utilization relative to a memory utilization up-size threshold and a memory utilization down-size threshold for the VM, and a current memory compression factor of total effective memory based on compression. When the VM is above the memory utilization up-size threshold and at a maximum memory allocation, a memory compression factor is increased. When the VM is below the memory utilization down-size threshold and the current memory compression factor is greater than one, the memory compression factor is decreased.

Figure 1:
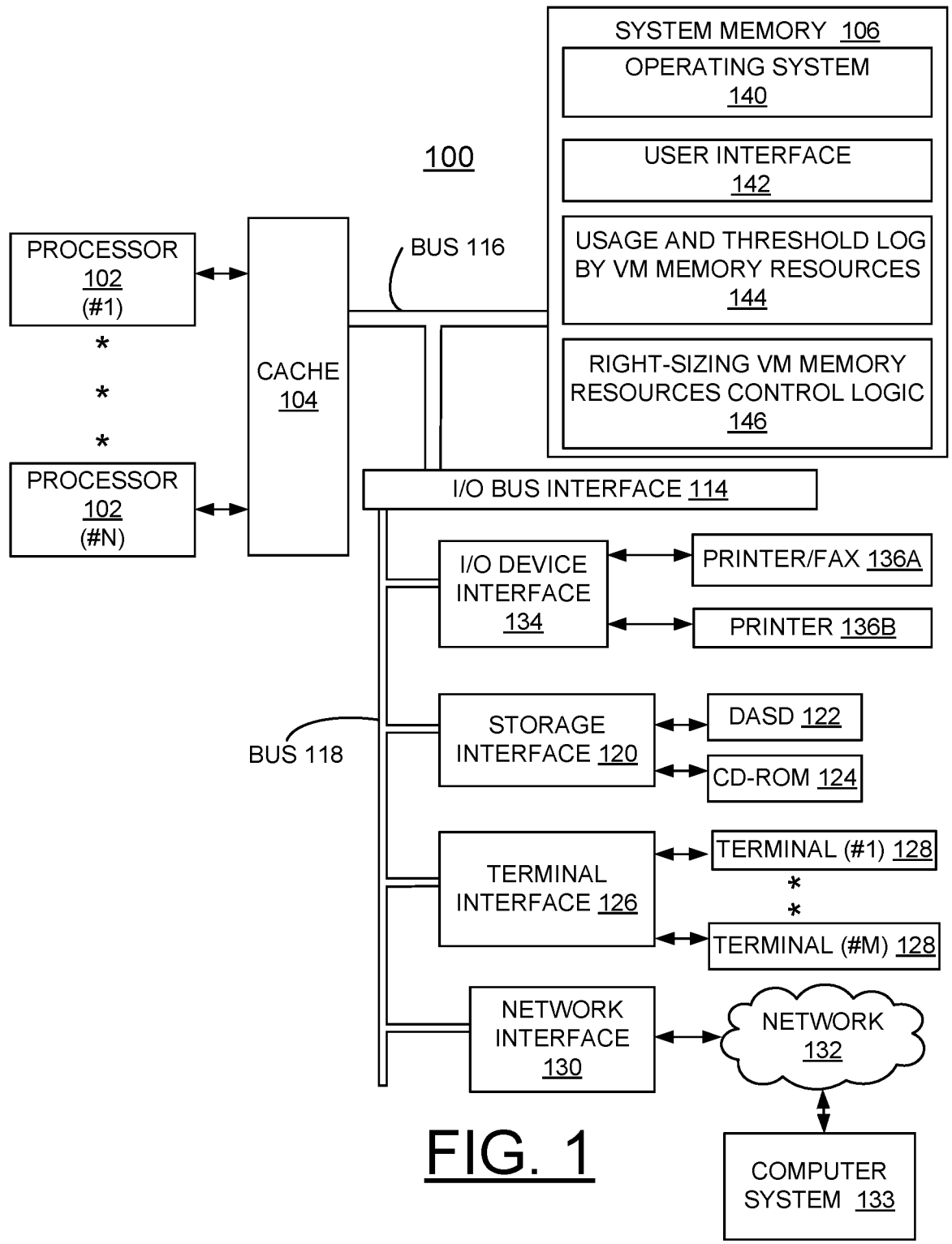
FIG. 1 is a block diagram of an example computer system for implementing virtual machine (VM) memory right-sizing using VM memory compression in accordance with the preferred embodiment.

Having reference now to the drawings, in FIG. 1, there is shown a computer system embodying the present invention generally designated by the reference character 100 for implementing virtual machine (VM) memory right-sizing using VM memory compression in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including applications and programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores an operating system 140, a user interface 142, a usage and threshold log by VM memory resources 144, and a right-sizing VM memory resources control logic 146 in accordance with the preferred embodiments.

In accordance with features of the invention, VM memory resources are efficiently utilized based upon identifying predefined thresholds to determine when to up-size or down-size memory resources of a VM. The right-sizing VM memory resources control logic 146 enables both the up-size or down-size of VM memory resources of a running VM based upon memory utilization relative to predefined thresholds using memory compression.

Figure 2:
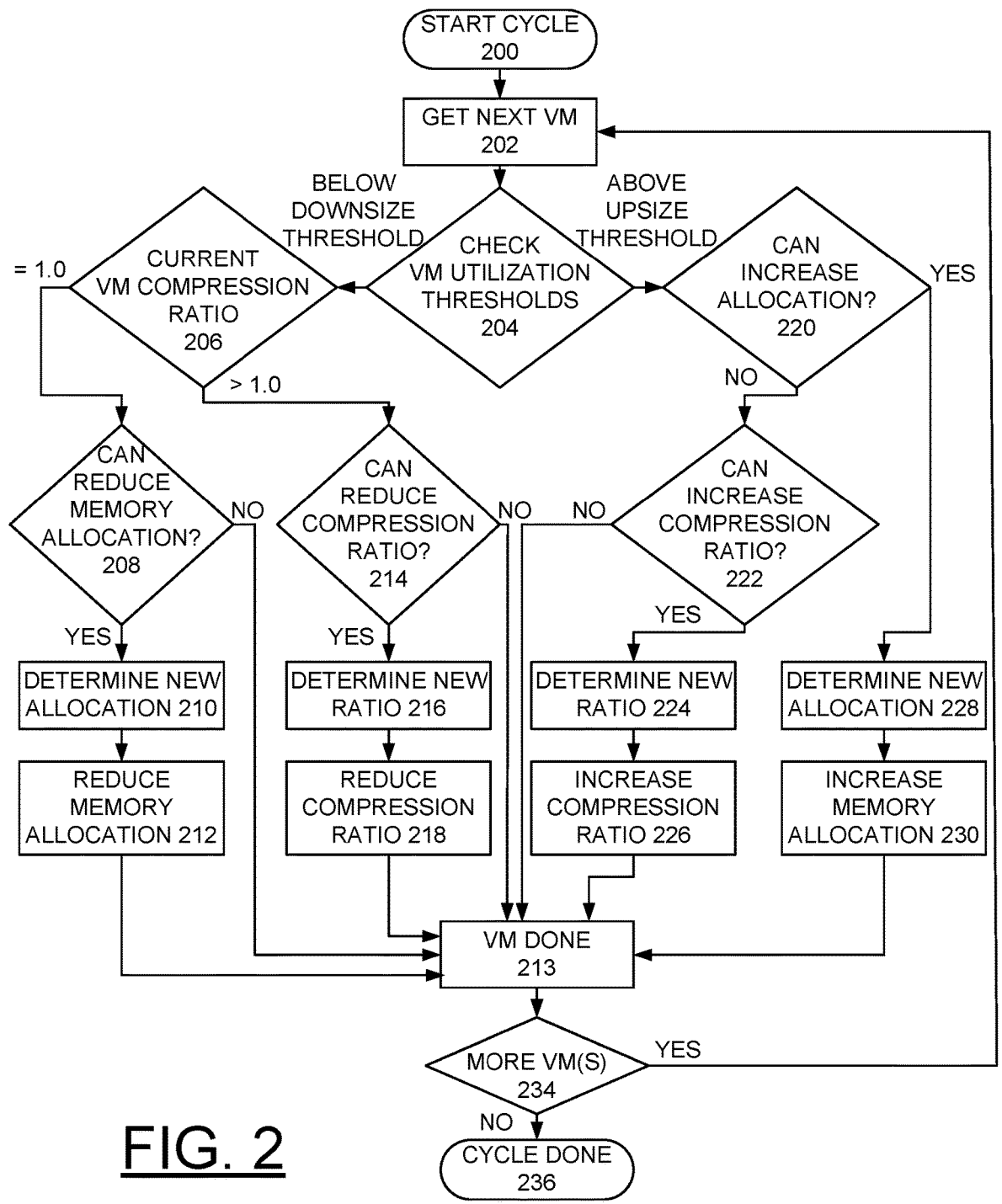
FIG. 2 is a flow chart illustrating example operations for implementing virtual machine (VM) memory right-sizing using VM memory compression in accordance with the preferred embodiment.

Referring now to FIG. 2, there is shown an example flow chart illustrating example operations generally designated by the reference character 200 for implementing virtual machine (VM) memory right-sizing using VM memory compression in accordance with the preferred embodiment, with operations beginning at a block 201 with a cycle start.

As indicated at a block 202, a next VM to process is obtained and checking VM resource memory utilization thresholds is performed as indicated at a decision block 204. When a virtual machine utilization below a downsize threshold is identified, checking a current compression ratio is performed as indicated at a decision block 206. In this manner, the control logic 146 of the present invention uses the usage and threshold log 144 to perform VM memory right-sizing.

In accordance with features of the invention, right-size processing the VM memory resources includes first to maximize compression and then begin VM memory allocation resizing. This maximizes available physical memory first at the cost of increased CPU utilization for the VM. A sample rate is set to match a right-sizing sample rate. For example, sample rate is set to determine the maximum viable compression factor needed to analyze the current workload. A length of time is specified as well as the number of samples to take. Right-sizing uses a run-interval or number of minutes between utilization checks and stabilization or number of times a VM is above the threshold being deemed violated. For example, VMs with a memory utilization above the up-size threshold have the VM memory allocation increased. VMs below the down-size threshold have the VM allocation decreased. For example, the following optional rules include if a VM's memory utilization is above 70% for more than 10 minutes, increase its physical memory allocation by 512 MB; and if a VM's memory utilization is below 30% for more than 15 minutes, decrease its physical memory allocation by 1 GB.

In accordance with features of the invention, right-size processing the VM memory resources takes into consideration memory compression capabilities; thus, providing enhanced right-sizing actions over conventional right-sizing arrangements.

When a current compression factor ratio equal to one (1.0) is identified at decision block 206, checking whether the memory allocation can be reduced is performed as indicated at a decision block 208. When the memory allocation can be reduced, a new memory allocation is determined as indicated at a block 210. Then the memory allocation for the VM is reduced as indicated at a block 212. VM processing is completed as indicated at a block 213.

In accordance with features of the invention, when a virtual machine has a compression factor>1.0 and is below the down-sizing threshold, checking is performed to determine if the compression ratio can be reduced. For example, with a VM allocated 8 GB memory with a compression factor of 1.5 means 12 GB is effectively available. The VM is using 3 GB giving a utilization of 25% (3/12=25%). If the down-size threshold is 30% the VM would be below the down-size threshold causing it to be violated. Assuming the VM is not at the minimum allocation, standard VM right-sizing alone could possibly address this by reducing the physical allocation. This would be sub-optimal because memory compression incurs a cost to CPU resources to compress and decompress the memory as it's used. The method of the present invention improves on this by attempting to reduce the compression factor when compression is not needed therefore addressing both the memory utilization and increasing available CPU.

When a current compression factor ratio greater than one (>1.0) is identified at decision block 206, checking whether the compression ratio can be reduced is performed as indicated at a decision block 214. When the compression ratio cannot be reduced, VM processing is done at block 213.

When the compression ratio can be reduced, a new compression ratio is identified as indicated at a block 216. For example, a decrease in the compression factor for a VM, such as with the compression factor reduced from 1.5 to 1.25 the effective available memory becomes 10 GB (8 physical GB*1.25=10 GB). The same 3 GB used now out of 10 GB becomes 30% utilization which satisfies the down-size threshold. By enhancing the right-sizing algorithm of the preferred embodiments, finer control over VM right-sizing is achieved. For memory-constrained hypervisors workload density is increased. As workloads change and memory constraints are eased, the compression advantageously is lower, increasing available CPU resources. This leads to increased overall workload efficiency. The compression ratio is reduced as indicated at a block 218. Then VM processing is completed at block 213.

In accordance with features of the invention, the required CPU utilization increases with memory compression. As compression is increased, the amount of CPU overhead required to support the compression increases. A current memory compression factor is the factor of total effective memory based on compression. For example, if a VM has 8 GB allocated (physical) memory and 10 GB effective usable memory, the compression factor would be 1.25 (8 GB*1.25=10 GB). There are limits to the amount of memory compression viable for any given workload called a maximum-viable-compression for current workload. Beyond the maximum-viable-compression may not be possible creating a memory deficit if attempted. A current workload is sampled to determine the maximum-viable-compression supported for the VM.

In accordance with features of the invention, optional user defined settings include a maximum-compression-CPU-utilization limiting a maximum increase to a VM's CPU utilization due to memory compression; a maximum-compression-factor based on the current workload; a maximum-compression-step size limiting a maximum increase to the compression factor for each cycle; and compress-before-resize to favor VM memory compression over resizing.

When a virtual machine utilization above an upsize threshold is identified at decision block 204, checking if memory allocation can be increased is performed as indicated at a decision block 220. When the memory allocation cannot be increased, checking if the compression ratio can be increased is performed as indicated at a decision block 222. When the compression ratio cannot be increased, VM processing is done at block 213.

When the compression ratio can be increased, a new compression ratio is determined as indicated at a block 224. The compression ratio is increased as indicated at a block 226. Then VM processing is completed at block 213.

When determined at decision block 220 that the memory allocation can be increased, a new memory allocation is determined as indicated at a block 228. Then the memory allocation for the VM is increased as indicated at a block 230. VM processing is completed as indicated at a block 213.

When the VM is above the memory up-size threshold and at a maximum memory allocation, the memory compression factor advantageously is increased by up to a predefined compression-step-size. Consider for example, with a given VM using 6 GB out of 7 GB allocated memory and having defines a maximum allocation of 8 GB. Now the VM is using 6 GB out of 7 GB giving a utilization of 86%. If the up-sizing threshold is 70%, the VM would be violating the up-sizing threshold. Standard right-sizing can increase its allocation up to 8 GB. When this happens, since used memory stays the same, the new utilization becomes 75% (6 GB/8 GB). This is better, but the up-sizing threshold is still not satisfied. Traditional right-sizing stops here because the VM is at its maximum allocation. In the preferred embodiment, the memory compression factor is increased by up to a predefined compression-step-size, and without exceeding a maximum-viable-compression or maximum-compression-factor (whichever is smaller). Also, the memory compression factor cannot be increased when the current CPU utilization due to compression is greater than a maximum-compression-CPU-utilization.

It should be understood that the right-sizing rules of the preferred embodiments can be augmented with other weighting aspects, for example, if there are mission-critical VMs and you want to ensure their thresholds are addressed first, an overriding weight could be applied to this entire process. Additionally, various memory compression technologies can be applied in accordance with the preferred embodiments.

Figure 3:
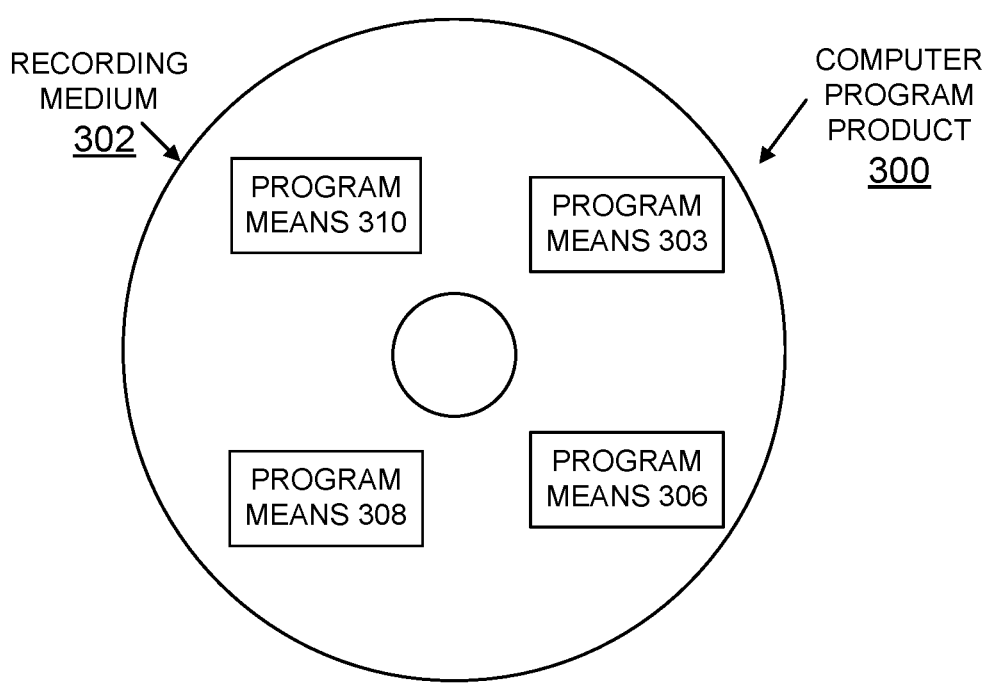
FIG. 3 is a block diagram illustrating a computer program product in accordance with the preferred embodiment.

Referring now to FIG. 3, an article of manufacture or a computer program product 300 of the invention is illustrated. The computer program product 300 is tangibly embodied on a non-transitory computer readable storage medium that includes a recording medium 302, such as, a floppy disk, a high capacity read only memory in the form of an optically read compact disk or CD-ROM, a tape, or another similar computer program product. The computer readable storage medium 302, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 302 stores program means or instructions 304, 306, 308, and 310 on the non-transitory computer readable storage medium 302 for carrying out the methods for implementing enhanced resource utilization in Power Virtualization Center (Power VC) after a dynamic resource optimization (DRO) threshold is exceeded on all processors in the system 100 of FIG. 1.

Computer readable program instructions 304, 306, 308, and 310 described herein can be downloaded to respective computing/processing devices from a computer readable storage medium or to an external computer or external storage device via a network, for example, the Internet, a local area network, a wide area network and/or a wireless network. The computer program product 300 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 304, 306, 308, and 310 from the network and forwards the computer readable program instructions for storage in a computer readable storage medium within the respective computing/processing device.

A sequence of program instructions or a logical assembly of one or more interrelated modules defined by the recorded program means 304, 306, 308, and 310, direct the system 100 for implementing enhanced resource utilization in Power Virtualization Center (Power VC) after a dynamic resource optimization (DRO) threshold is exceeded on all processors of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing virtual machine (VM) memory right-sizing using VM memory compression, said computer-implemented method implemented in a computer system including a processor, a right-sizing VM memory resources control logic tangibly embodied in a non-transitory machine readable medium, said right-sizing VM memory resources control logic comprising:

monitoring VM memory utilization relative to a memory utilization up-size threshold and a memory utilization down-size threshold for the VM, and a current memory compression factor of total effective memory based on compression; and increasing the memory compression factor responsive to the VM above the memory utilization up-size threshold and the VM at a maximum memory allocation; and decreasing the memory compression factor responsive to the VM below the memory utilization down-size threshold and the current memory compression factor is greater than one.

2. The method as recited in claim 1, includes increasing the memory compression factor by up to a predefined compression-step-size, addressing both memory utilization and increasing available CPU utilization.

3. The method as recited in claim 1, wherein increasing the memory compression factor includes increasing the memory compression factor by up to a predefined compression-step-size without exceeding a maximum compression CPU utilization.

4. The method as recited in claim 1, wherein increasing the memory compression factor includes increasing the memory compression factor by up to a predefined compression-step-size without exceeding a maximum viable compression.

5. The method as recited in claim 4, wherein identifying the maximum viable compression includes sampling a current workload to identify a maximum compression supported.

6. The method as recited in claim 1, wherein increasing the memory compression factor includes increasing the memory compression factor by up to a predefined compression-step-size without exceeding a maximum compression factor.

7. The method as recited in claim 1, further comprising identifying a maximum increase to VM CPU utilization due to memory compression.

8. The method as recited in claim 1, further comprising identifying a maximum compression factor based on a current workload.

9. The method as recited in claim 1, further comprising identifying a maximum compression size step based on a maximum compression factor increase for each cycle.

10. The method as recited in claim 1, further comprising providing a VM compression factor change before providing a VM memory allocation change.

11. The method as recited in claim 1, wherein decreasing the memory compression factor includes decreasing the memory compression factor by up to a predefined compression-step-size without dropping below a current VM compression ratio of one.

12. A system for implementing virtual machine (VM) memory right-sizing using VM memory compression, comprising:

a processor;

a right-sizing VM memory resources control logic tangibly embodied in a non-transitory machine readable medium;

said processor using said right-sizing VM memory resources control logic to perform:

monitoring VM memory utilization relative to a memory utilization up-size threshold and a memory utilization down-size threshold for a VM, and a current memory compression factor of total effective memory based on compression; and increasing a memory compression factor responsive to the VM above the memory utilization up-size threshold and the VM at a maximum memory allocation; and decreasing the memory compression factor responsive to the VM below the memory utilization down-size threshold and the current memory compression factor is greater than one.

13. The system as recited in claim 12, includes increasing the memory compression factor by up to a predefined compression-step-size, addressing both memory utilization and increasing available CPU utilization.

14. The system as recited in claim 12, includes increasing the memory compression factor by up to a predefined compression-step-size without exceeding a maximum compression CPU utilization.

15. The system as recited in claim 12, includes increasing the memory compression factor by up to a predefined compression-step-size without exceeding a maximum viable compression.

16. The system as recited in claim 12, includes identifying a maximum viable compression by sampling a current workload to identify a maximum compression supported.

17. The system as recited in claim 12, includes identifying a maximum increase to VM CPU utilization due to memory compression.

18. The system as recited in claim 12, includes decreasing the memory compression factor by up to a predefined compression-step-size without dropping below a current VM compression ratio of one.

19. The system as recited in claim 12, includes identifying a maximum compression size step based on a maximum compression factor increase for each right-sizing cycle.

20. The system as recited in claim 12, includes increasing the memory compression factor by up to a predefined compression-step-size without exceeding a maximum compression factor.

* * * * *